March 25, 1941.  H. M. BIEBEL  2,236,395
TIMER CONTROL
Filed Oct. 27, 1939  2 Sheets-Sheet 1
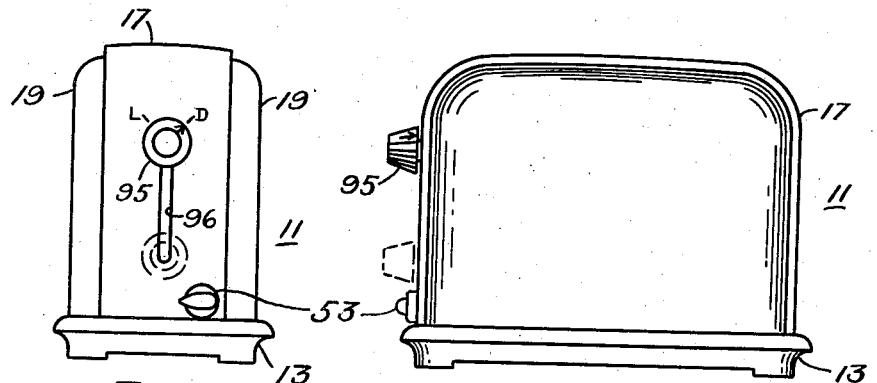
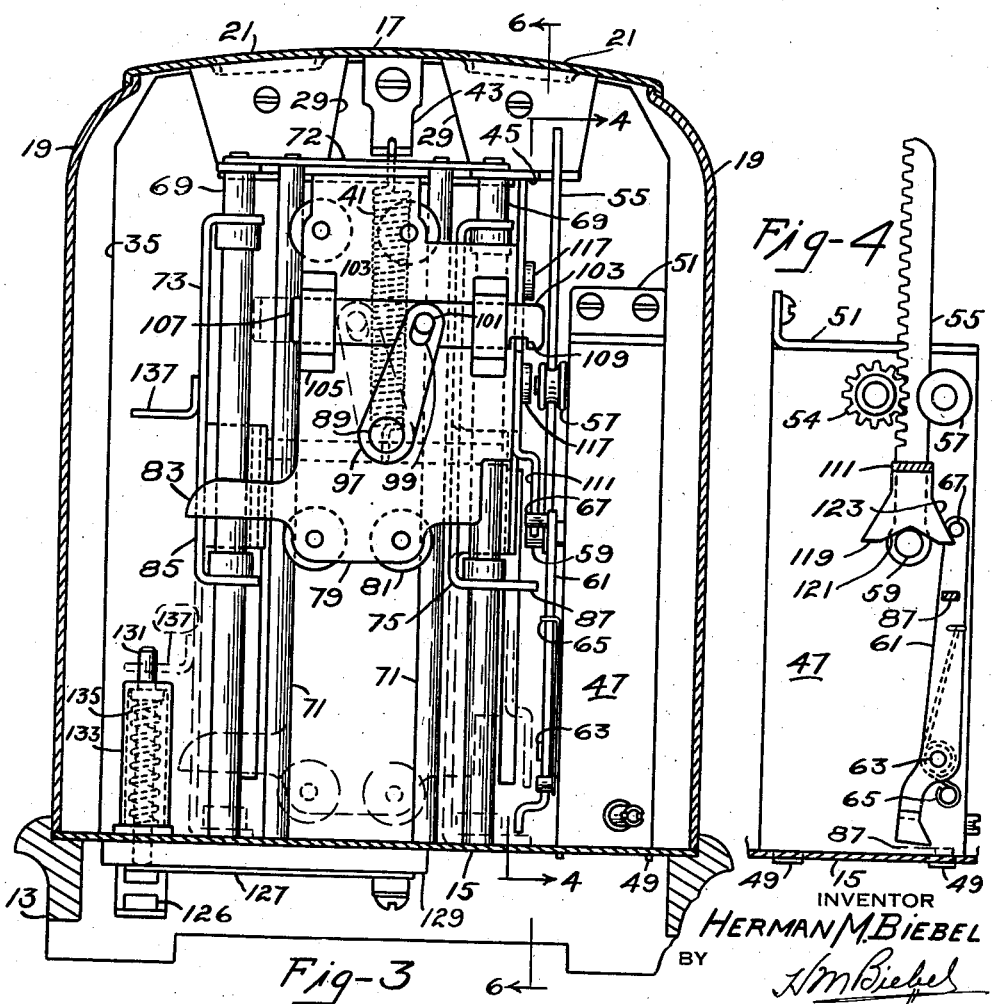
INVENTOR
HERMAN M. BIEBEL
BY
H. M. Biebel
ATTORNEY

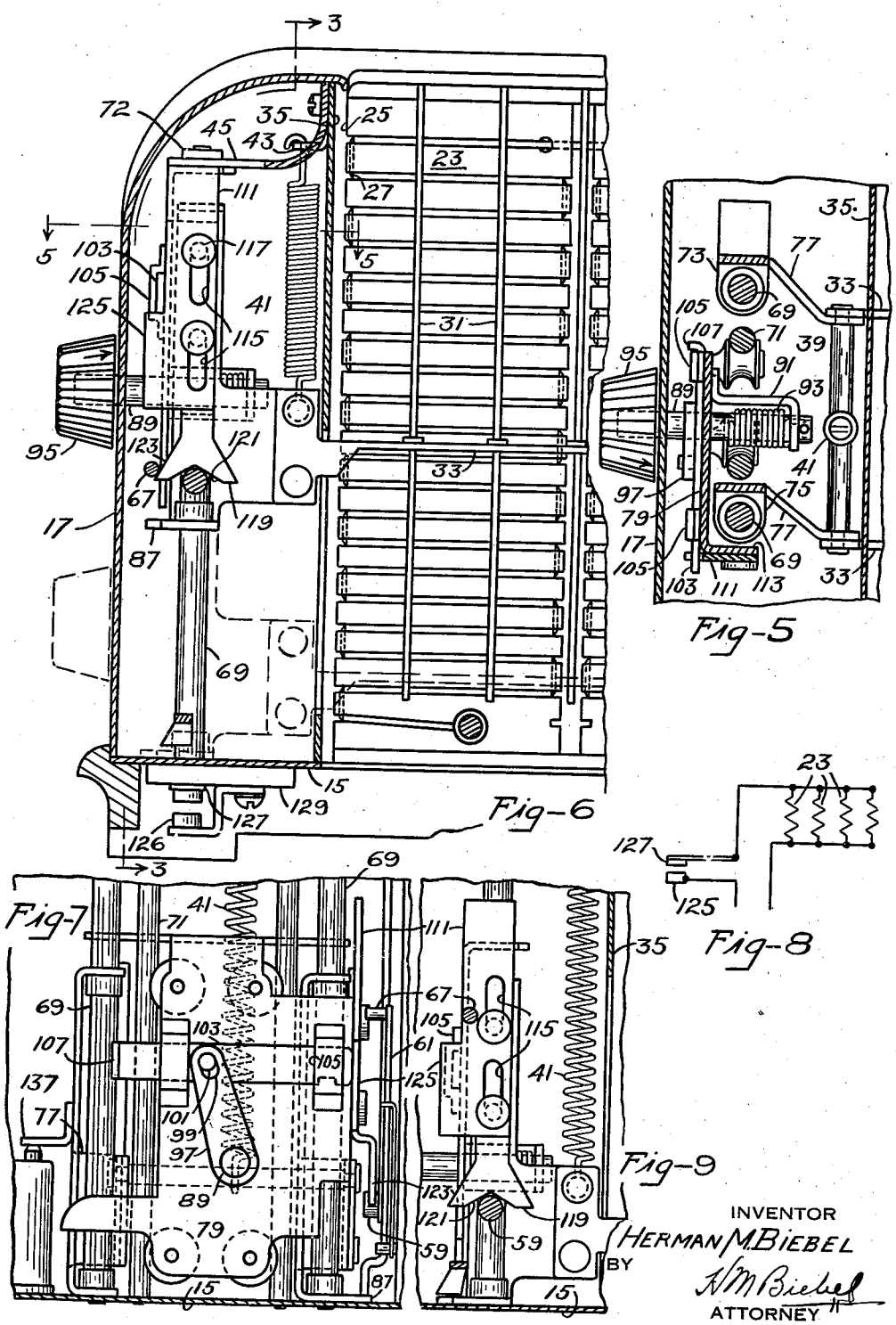

Patented Mar. 25, 1941

2,236,395

UNITED STATES PATENT OFFICE 2,236,395

TIMER CONTROL

Herman M. Biebel, Elgin, Ill., assignor to McGraw Electric Company, Elgin, Ill., a corporation of Delaware Application October 27, 1939, Serial No. 301,555

8 Claims. (Cl. 161—16)

My invention relates to automatic electric toasters and particularly to timer adjusting or controlling means therefor.

One of the objects of my invention is to provide a relatively simple manually operable means for varying the duration of a toasting operation.

Another object of my invention is to provide means for varying the degree of winding up of a mechanical timer as well as the duration of the operative run-down period of such a timer.

Another object of my invention is to provide a relatively simple means operable only before initiating a toasting operation and selecting the period of time during which a slice or slices of bread will be toasted in the toaster.

Other objects of my invention will either be obvious from a description of one form of device embodying my invention now preferred by me or will be specifically pointed out in the course of a description thereof and will be set forth in the appended claims.

In the drawings,

Figure 1 is a front view of a toaster, on a reduced scale, showing certain parts thereof in non-toasting position, Fig. 2 is a side elevational view thereof with the parts shown in the same position as in Fig. 1, Fig. 3 is a front elevational view taken on the line 3—3 of Fig. 6, with certain of the parts shown in non-toasting position, Fig. 4 is a side elevational view of the mechanical timer taken on the line 4—4 of Fig. 3, illustrating particularly the detent lever, the wind-up rack and the timer-winding and detent-tripping member, Fig. 5 is a fragmentary horizontal sectional view taken on the line 5—5 of Fig. 6, Fig. 6 is a fragmentary side elevational view taken on the line 6—6 of Fig. 3, Fig. 7 is a fragmentary front elevational view showing the parts in toasting position, with certain control parts set in position for light toasting, Fig. 8 is a diagram of the electrical connections of the toaster heating elements, and, Fig. 9 is a side elevational view of the parts shown in Fig. 7 of the drawings.

I have elected to show my invention as applied to a well known automatic electric toaster and certain parts will be illustrated and described in order to show the application of my invention thereto although I desire it to be understood that my invention is not limited to the particular details of construction of a toaster shown in the drawings.

A toaster 11 includes a base 13 of moulded composition material having mounted thereon adjacent its upper surface a base plate 15. The toaster includes also a casing, comprising a central part 17 of inverted U-shape, the side portions of which interfit with side plates 19, portion 17 being provided with one or more elongated openings 21 through which slices of bread may be inserted into the toaster and through which slices of toast may be removed from the toaster.

I provide pairs of planar vertically extending electric heating elements 23, the number of these pairs being in accordance with the number of slices of bread which the toaster may be designed to toast at one time. These electric heating elements include one or more pieces of mica 25 and resistor ribbon 27 wound thereon in a manner well known in the art. The lower edge portions of these heating elements may interfit with the base plate 15 while the upper edge portions thereof may be held in proper operative positions by top frame plates 29. Depending guard or guide wires 31 are provided which may be suspended from the frame plates 29.

Means for supporting one or more slices of bread in the toaster, which has been shown as a two-slice toaster in the drawings, may include bread carriers 33, of which two are provided as shown in the drawings. These bread carriers have portions extending through a front intermediate wall 35, of thin sheet metal, while the rear end portions of these carriers will extend through suitable slots in a rear intermediate wall not shown in the drawings but well known in the art. The front end portions of the carriers 33 may be held rigidly connected together by a bar or rod 39 (see Fig. 5), a biasing spring 41 having one of its ends connected to the rod 39 while the other end thereof may be connected to a bracket 43 secured to the front intermediate wall. This spring 41 biases the carriers normally and yieldingly into their upper or non-toasting position, from which position they may be moved by means to be hereinafter set forth, into their lower or toasting position shown in broken lines in Fig. 6 of the drawings.

I provide a mechanical timer 41 which may be of the kind disclosed and claimed in Ireland Patent No. 1,866,808 assigned to the same assignee as is the present application. Generally the timer 41 may be a variable speed timer, that is, one which may be controlled manually or thermostatically to vary its speed. When controlled manually the operator will adjust its speed in accordance with the temperature of the toaster of which the timer is a part and if the same is thermostatically controlled, a thermoflexible bar will vary the speed of the timer in accordance with the temperature of the toasting chamber, all as disclosed and claimed in Graham Patent No. 2,138,674 assigned to the same assignee as is the present application. I do not desire, however, to be limited to the use of a variable speed timer but may use a constant speed timer, in which case no thermal control is possible.

The lower end of timer 47 may be held in proper operative position by depending portions 49 thereof, interfitting with base plate 15 (see Fig. 4), while the upper part thereof may be held by a bracket 51, of substantially L-shape, secured against the front intermediate wall 25. When the timer is a variable speed timer, a small speed-adjusting knob 53 is provided to permit of manual adjustment of the timer before or during a toasting operation, all as disclosed and claimed in Patent No. 1,866,808.

The timer 47 is provided with a winding pinion 54 meshing with a rack bar 55, this rack bar being held in proper operative position and meshing with pinion 54 by a grooved roller 57. The lower end of rack bar 55 is provided with a laterally projecting pin 59 by means of which the timer may be wound by downward movement of the rack bar 55. The timer is further provided with a pivotally mounted detent lever 61, the lower end of which is so arranged and positioned that it may be engaged by means to be hereinafter described and connected with the carrier to hold the carrier in lowered or toasting position. The detent lever 61 is pivotally mounted on a short stub shaft or pin 63 and is normally yieldingly biased to its operative position by a spring 65, the upper end of the detent lever 61 being provided with a pin 67 for a purpose to be hereinafter referred to.

The toaster structure is further provided with an outer pair of vertically extending rods or standards 69 and an inner pair of vertically extending rods or standards 71, the lower ends of which may interfit with and be held by base plate 15 while the upper ends thereof may have interfitting engagement with the front end portions of the top frame plates 29 and with a cross bar 72. The outer pair of standards 69 have vertically movably mounted thereon a pair of sliders 73 and 75. These sliders have rearwardly extending portions 77 (see Fig. 5) which may also engage with the rod 39 whereby the two sliders 73 and 75 and the carriers 33 may be rigidly secured together to cause them to move in unison.

The inner pair of standards 71 have mounted thereon a vertically movable carriage plate 79 as by use of rollers 81, so that the carriage plate 79 may be moved vertically upwardly and downwardly with relatively little friction on its supporting standards 71. The carriage 79 is provided with a lateral extension 83 which is adapted to fit over a forwardly extending portion 85 on slider 73 so that when the carriage plate 79 is moved downwardly the sliders and the bread carriers will also be moved downwardly. However, it is possible for the carriage plate 79 to move upwardly, as will be later described, while the bread carriers and the sliders remain in their lower and toasting position. The right-hand slider 75 is provided with an extension 87 which extension 87 is adapted to fit under and engage the lower end portion of detent lever 61. When the extension 87 is moved downwardly it will engage and cause slight turning movement of the lower end portion of detent lever 61 and then fit thereunder to be held thereby in its lowered position with the sliders and the carriers in their lower position.

The carriage 79 has mounted thereon a stub shaft 89, the rear end portion of which extends through and is supported by a bracket 91 (see Fig. 5), the shaft 89 being so supported as to be capable of turning movement in its supports. A biasing spring 93 is so arranged in combination with the shaft 89 that the shaft is normally yieldingly biased in a clockwise direction and held in such position by means to be described. A knob 95 is fixedly mounted on the front end of shaft 89 whereby an operator may move the carriage 79 and the sliders and bread carriers downwardly from non-toasting to toasting position, a slot 96 being provided in the front part of the casing portion 17 to permit of this movement.

A lever arm 97 is fixedly mounted on the shaft 89 at one of its ends, the other end thereof being provided with an elongated slot 99 which is adapted to receive a pin 101 fixedly mounted on a horizontally movable bar 103. This bar is supported by brackets 105 secured to the front surface of carriage 79. The left-hand end of bar 103 may be bent over as shown at 107 in Fig. 5 of the drawings to limit the right-hand movement thereof. The bar 103 is provided near its right-hand end with a recess 109 in its lower edge. The bias of spring 93 and of shaft 89 is such that lever arm 97 will be turned to the position shown in full lines in Fig. 3 of the drawings, further turning movement of arm 97 and further longitudinal movement of bar 103 being prevented by the lateral lug 107 engaging the left-hand supporting bracket 105.

A combined timer-winding and detent lever tripping member 111 is movably mounted against the right-hand side of carriage 79, this carriage having a rearwardly extending flanged portion 113 to receive and support member 111. This timer-winding and detent-tripping member 111 is of generally plate or bar shape extending longitudinally vertically of the carriage 79. Member 111 is provided with a pair of elongated slots 115 through which extend pins 117 which are fixedly secured in flange portion 113. The lower end of member 111 is provided with a widened portion 119 having a recess of inverted V-shape 131 therein and is provided with a cam surface 123 at its forward edge, which cam surface is adapted to engage pin 67 on lever arm 61 to cause clockwise turning movement thereof (as seen in Fig. 4) to cause releasing movement of the detent lever 61 at the end of a toasting operation with resultant upward movement of the carriers and the sliders.

The length of member 111 is such that when the carriage is in its upper or non-toasting position, the upper end of member 111 will engage with the lower surface of the front end portion of the right-hand top frame plate 29 whereby member 111 is moved to the lowermost position on carriage 79 which it can occupy relatively thereto.

The recess 109 in bar 103 will then be adapted to receive the upper edge of a forwardly extending portion 125 on member 111 so that when an operator presses down on knob 95 without any turning movement, the member 111 will be maintained in substantially its lowermost position relatively to the carriage 79. This downward movement, by an operator of the carriage, of the sliders and the carriers, will effect winding up of the mechanical timer 47 to substantially the maximum amount desired. The extension 87 of slider 75 engages under the lower end of detent 61. The timer will then begin to run down causing upward movement of the rack bar 55, of member 111 and carriage 79 until cam surface 123 on portion 119 engages pin 67 on the detent lever causing turning movement of the lever to a carrier-releasing position, whereupon spring 41 causes sudden upward movement of the bread carriers and the sliders to non-toasting position.

Let it now be supposed that an operator desires to obtain a different and particularly a lesser degree of toasting of a slice or slices of bread to be operated upon, he causes a turning movement of the knob 95 in a counter-clockwise direction before exerting any downward pressure on the knob to initiate a toasting operation. When this is done by the operator, bar 103 will be moved to the position shown in Fig. 7 of the drawings so that its right-hand end will be out of engagement with member 111 and when the operator now presses downwardly on knob 95, member 111 will momentarily remain substantially stationary because of the engagement of pin 59 on the rack bar 55 with the V-groove 121, until the carriage 79, and particularly the pins 117 thereon, have been moved downwardly into the positions shown in Fig. 9 of the drawings, the pins 117 now being located in the lower part of the elongated slots 115. Winding up of the timer will now begin, assuming that the operator continues to move the knob 95 downwardly, but it is evident that the timer will not be wound to the same degree as would be done if the knob 95 had not been turned, all as hereinbefore described. The carriers will be moved to their toasting position and the extension 87 will move under and into locking engagement with the lower end of detent lever 61. Bar 103 will be held in the position shown in Fig. 7 with its right-hand end engaging the adjacent face of extension 125, so that it is impossible for the operator to make any change in the position of bar 103, so long as he continues the downward movement of the knob and the parts connected therewith and during the rest of the toasting operation. The timer will now begin to run down but it will be noted that member 111 and the cam surface 123 thereon is in a higher position relatively to the carriage 79 so that the cam surface 123 will engage pin 67 earlier than would be the case if member 111 were in the other lower position relatively to carriage 79 as described heretofore in connection with the first operation of the toaster. It is thus evident that turning movement of knob 95 in a counter-clockwise direction preparatory to initiating a toasting operation, results in less than full winding up of the timer and in an earlier bread carrier release than would be effected if no such turning of the knob had been done by the operator.

Reference is here made to my co-pending application, Ser. No. 299,940 filed October 18, 1939, and assigned to the same assignee as is this application. In that application I have disclosed and claimed an auxiliary detent tripping member which is effective when moved into operative position to cause an earlier tripping or release of the detent lever than is effected by the main timer-winding and detent-tripping member. In the present device I disclose and claim means constituted by a single timer-winding and detent-tripping member which permits of not only decreasing the degree of winding of a mechanical timer effected by a full or constant length movement of the actuating knob, but also provides an earlier detent-tripping means so that I obtain a much greater difference between the normal operation of the timer and an operation in which a lesser degree of toasting is desired by an operator.

It will be noted further that if the toaster embodying my invention is set for a given degree of toasting, such as dark, and if an operator desires to obtain a lighter or lesser degree of toasting, and so operates the toaster, the timer-winding and detent-tripping member is automatically returned to its normal or long-time winding position relatively to the carriage 79 at the end of that toasting operation in the following manner. During the upward movement of carriage 79, trip member 111 and bar 103 move as one unit. When the upper end of member 111 engages member 45 its movement is stopped, carriage 79 is momentarily stopped until sliders 73 and 75 overtake it and then completes its upward movement at which time bar 103 will be clear of extension 125 and free to move into its right-hand position under the influence of the biasing spring 93.

If it is desired to control also the energization of the plurality of heating elements 23, I may provide a fixed contact member 126 and a spring contact arm 127 insulatedly mounted on a small plate 129 of electric-insulating material secured to and below the base plate 15. Contact arm 127 may be moved downwardly by an actuating rod 131 having the greater portion of its length positioned within a tubular casing 133, rod 131 being biased upwardly by a spring 135 so that normally contact spring 127 is out of engagement with fixed contact member 126. A bracket 137 is fixedly secured to slider 73 so that when the sliders are moved downwardly, bracket 137 is moved into the broken line positions shown in Fig. 3 of the drawings, whereby the rod 131 is moved downwardly to cause contact bar 127 to engage contact 126. It is obvious of course that when slider 73 is moved upwardly, as hereinbefore explained, by spring 41 at the end of a toasting operation, the heaters will be deenergized.

While I have illustrated and described a specific embodiment of my invention as applied to a particular design of toaster structure, I desire it to be understood that my invention is not limited to the particular parts shown in the drawings and described in the specification and that all obvious modifications clearly within the scope of the appended claims are to be considered as covered thereby.

I claim as my invention:

1. In an automatic electric toaster comprising toast heating elements, a bread carrier movable to toasting and non-toasting positions relatively to the toast heating elements and normally yieldingly biased to non-toasting position, means movable through a fixed distance in one direction to cause the carrier to move into toasting position, a detent to hold the carrier in toasting position and a mechanical timer, the improvement comprising a timer-winding and detent-trip member mounted on the carrier moving means, effective to cause wind-up of the timer when the carrier is moved into toasting position and then being moved by the operating timer to cause release movement of the detent, said trip member having two opposite limiting positions relatively to its support to cause selectively different wind-ups of the timer and selectively different durations of operation of the timer before said trip member engages and causes release of said carrier-holding detent and means normally locking said trip member in one of its limiting positions.

2. In an automatic electric toaster comprising toast heating elements, a bread carrier movable to toasting and non-toasting positions relatively to the toast heating elements and normally yieldingly biased to non-toasting position, means movable through a fixed distance in one direction to cause the carrier to move into toasting position, a detent to hold the carrier in toasting position and a mechanical timer, the improvement comprising a timer-winding and detent-trip member mounted on the carrier moving means, effective to cause wind-up of the timer when the carrier is moved into toasting position and then being moved by the operating timer to cause release movement of the detent, said trip member having two opposite limiting positions relatively to its support to cause selectively different wind-ups of the timer and selectively different durations of operation of the timer before said trip member engages and causes release of said carrier-holding detent and means locking said trip member in that one of its positions where it will cause full wind-up of the timer and full duration of timer operation before release of the detent.

3. In an automatic electric toaster comprising toast heating elements, a bread carrier movable to toasting and non-toasting positions relatively to the toast heating elements and normally yieldingly biased to non-toasting position, means movable through a fixed distance in one direction to cause the carrier to move into toasting position to initiate a toasting operation, a detent to hold the carrier in toasting position and a mechanical timer, the improvement comprising a timer-winding and detent-tripping member mounted on the carrier moving means, effective to cause wind-up of the timer when the carrier is being moved into toasting position and then being moved by the operating timer in a return direction to engage and cause carrier-release movement of the detent, means supporting said detent-tripping member on said carrier-moving means to cause said member to selectively occupy either one of two opposed operative positions thereon to vary the degree of timer wind-up and duration of timer operation to cause detent release movement by said detent-tripping member, means locking said detent-tripping member in one of its operative positions and manually-actuable means effective only before starting movement of the carrier-moving means to cause unlocking movement of said detent-tripping member locking means to cause movement of said detent-tripping member into its other operative position on starting movement of the carrier-moving means to initiate a toasting operation.

4. A device as set forth in claim 3 and including means to cause return of said detent-tripping member to said one position when the bread carrier has been returned to non-toasting position.

5. In an automatic electric toaster comprising toast heating elements, a control switch for said toast heating elements normally yieldingly biased to open position, means including a knob movable through a fixed distance in one direction to cause closing of said switch, a detent to hold said switch closed during a toasting operation and a mechanical timer for terminating a toasting operation, the improvement comprising a timer-winding and detent-tripping member mounted on said switch-closing means, effective to cause wind-up of the timer when said switch-closing means is moved in said one direction and then being moved in the opposite direction by the operating timer to engage said detent and cause release movement thereof, said timer winding and detent-tripping member having two opposed limiting positions relatively to its support to cause selectively different degrees of wind-up of the timer and selectively different durations of operation of the timer to cause said detent-tripping member to engage said detent and cause release movement thereof and means normally locking said detent-tripping member in that position to cause full wind-up of the timer and to require a relatively long duration of operation of the timer before release movement of the detent is effected.

6. In an automatic electric toaster comprising toast heating elements, a control switch for said toast heating elements normally yieldingly biased to open position, means including a knob movable through a fixed distance in one direction to cause closing of said switch, a detent to hold said switch closed during a toasting operation and a mechanical timer for terminating a toasting operation, the improvement comprising a timer-winding and detent-tripping member mounted on said switch-closing means, effective to cause wind-up of the timer when said switch-closing means is moved in said one direction and then being moved in the opposite direction by the operating timer to engage said detent and cause release movement thereof, said timer-winding and detent-tripping member having two opposed limiting positions relatively to its support to cause selectively different degrees of wind-up of the timer and selectively different durations of operation of the timer to cause said detent-tripping member to engage said detent and cause release movement thereof, means normally locking said detent-tripping member in that position to cause full wind-up of the timer and to require a relatively long duration of operation of the timer before release movement of the detent is effected and means including said knob actuable only before said switch-closing means is moved in said one direction to cause closing of said switch to move said locking means to cause movement of said timer-winding and detent-tripping member to its other position on moving the switch-closing means in said one direction.

7. In an automatic electric toaster comprising toast heating elements, a control switch for said toast heating elements normally yieldingly biased to open position, means including a knob movable through a fixed distance in one direction to cause closing of said switch, a detent to hold said switch closed during a toasting operation and a mechanical timer for terminating a toasting operation, the improvement comprising a timer-winding and detent-tripping member mounted on said switch-closing means, effective to cause wind-up of the timer when said switch-closing means is moved in said one direction and then being moved in the opposite direction by the operating timer to engage said detent and cause release movement thereof, said timer-winding and detent-tripping member heaving two opposed limiting positions relatively to its support to cause selectively different degrees of wind-up of the timer and selectively different durations of operation of the timer to cause said detent-tripping member to engage said detent and cause release movement thereof, means normally locking said detent-tripping member in that position to cause full wind-up of the timer and to require a relatively long duration of operation of the timer before release movement of the detent is effected, means including said knob actuable only before said switch-closing means is moved in said one direction to cause closing of said switch to move said locking means to cause movement of said timer-winding and detent-tripping member to its other position on moving the switch-closing means in said one direction and means effective at the end of a toasting operation to cause return of the timer-winding and detent-tripping member to its initial locked position.

8. In an automatic electric toaster comprising toast heating elements, a bread carrier movable to toasting and non-toasting positions relatively to the toast heating elements and normally yieldingly biased to non-toasting position, means movable through a fixed distance in one direction to cause the carrier to move into toasting position, a detent to hold the carrier in toasting position and a mechanical timer, the improvement comprising a timer-winding and detent-trip member mounted on the carrier moving means, effective to cause wind-up of the timer when the carrier is moved into toasting position and then being moved by the operating timer to cause release movement of the detent, said trip member having two opposite limiting positions relatively to its support to cause selectively different wind-ups of the timer and selectively different durations of operation of the timer before said trip member engages and causes release of said carrier-holding detent, means normally locking said timer-winding and detent-tripping member in that one of its positions where it will effect full wind-up of the timer and require full duration of timer operation before release of the detent, and manually-actuable means on said carrier-moving means operable only before starting movement of the carrier toward toasting position to cause unlocking movement of the locking means and to cause said timer-winding and detent-tripping member to be moved into the other of its positions on operation of the carrier-moving means to cause movement of the carrier into toasting position.

HERMAN M. BIEBEL.